United States Patent [19]

Walker et al.

[11] Patent Number: 4,830,564

[45] Date of Patent: May 16, 1989

[54] METHOD AND APPARATUS FOR TRANSFERRING EGGS

[75] Inventors: Kenneth Walker, Cullman; David Hutchinson, Hanceville, both of Ala.

[73] Assignee: Gold Kist Inc., Atlanta, Ga.

[21] Appl. No.: 79,405

[22] Filed: Jul. 30, 1987

[51] Int. Cl.[4] .............................. B65G 65/23
[52] U.S. Cl. .................... 414/405; 414/421; 414/763
[58] Field of Search ............ 414/404, 405, 419, 421, 414/425, 763, 771, 783, 786; 53/243, 247

[56] References Cited

U.S. PATENT DOCUMENTS

| | | | |
|---|---|---|---|
| 808,117 | 12/1905 | Shoemaker | 356/64 |
| 1,655,134 | 1/1928 | Clisson | 414/771 |
| 2,259,728 | 10/1941 | Bridges | 414/783 X |
| 2,511,285 | 6/1950 | Meincke | 414/783 X |
| 2,626,071 | 1/1953 | Smith | 414/421 |
| 2,627,335 | 2/1953 | Gedris | 414/783 X |
| 2,729,375 | 1/1956 | Pace | 414/404 X |
| 3,552,582 | 1/1971 | Henft | 414/739 |
| 4,344,730 | 8/1972 | Dvorak | 414/405 |
| 4,498,840 | 2/1985 | Orii | 414/759 |

Primary Examiner—David A. Bucci
Attorney, Agent, or Firm—Foley & Lardner, Schwartz, Jeffery, Schwaab, Mack, Blumenthal & Evans

[57] ABSTRACT

A method and apparatus for transferring eggs from an incubator flat to a hatching tray. The apparatus comprises a table, a frame pivotally mounted to the table, a main air cylinder, a rack and pinion connection between the main air cylinder and the frame, and clamping arrangements located on the frame together with first and second air cylinders for driving the clamping arrangements.

7 Claims, 5 Drawing Sheets

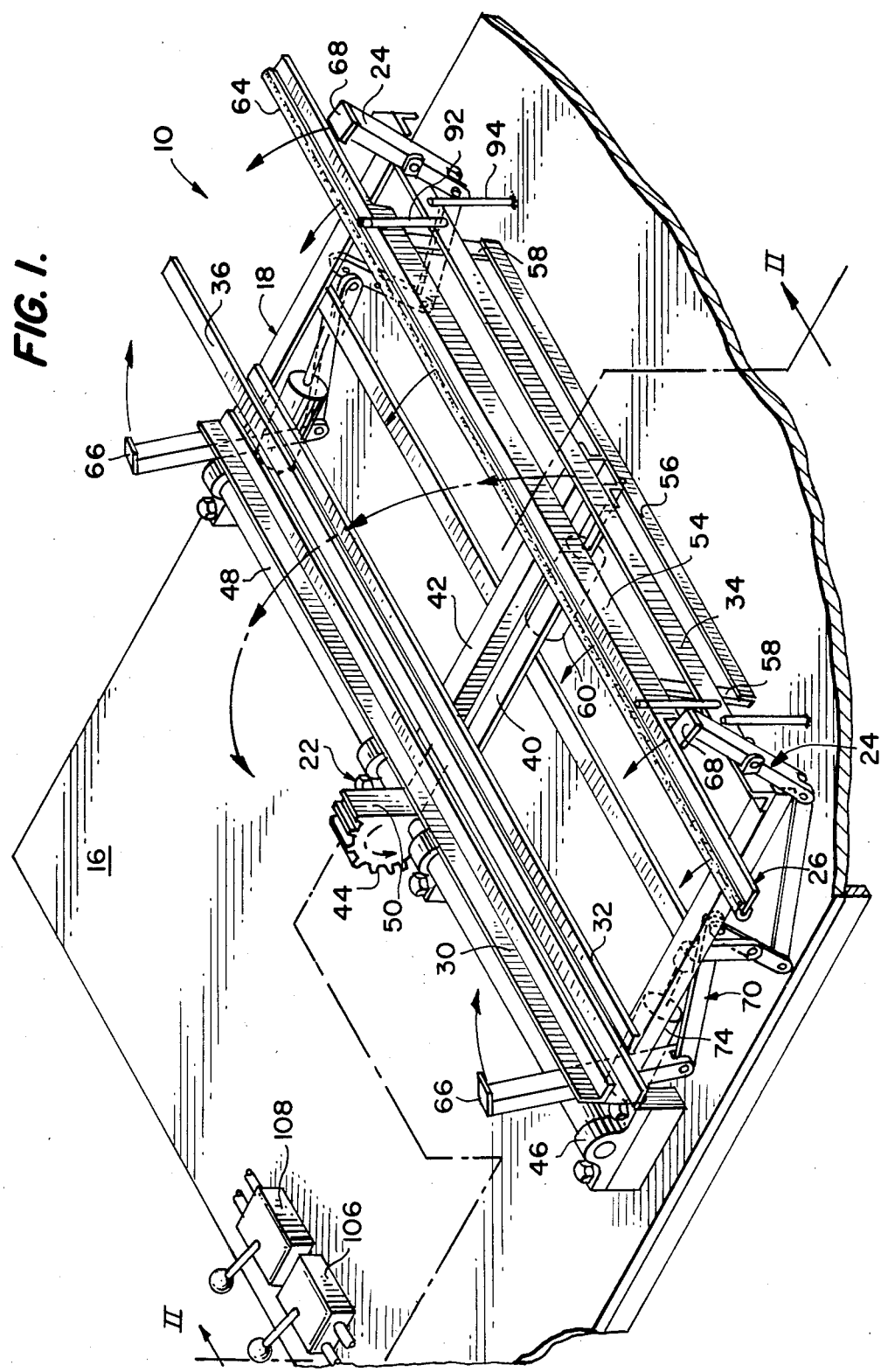

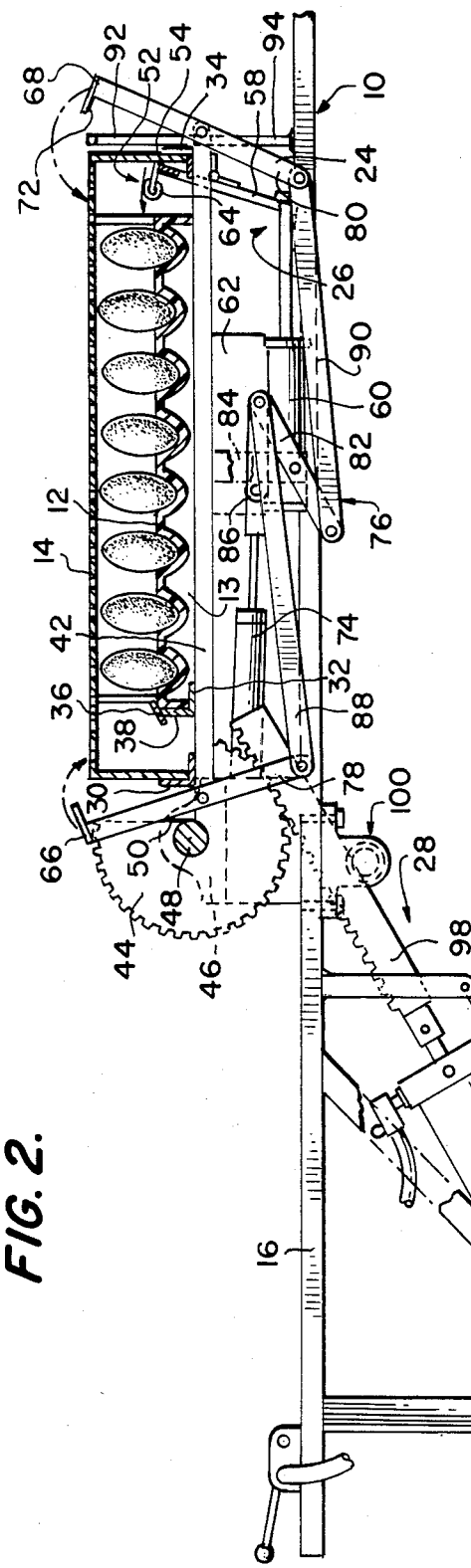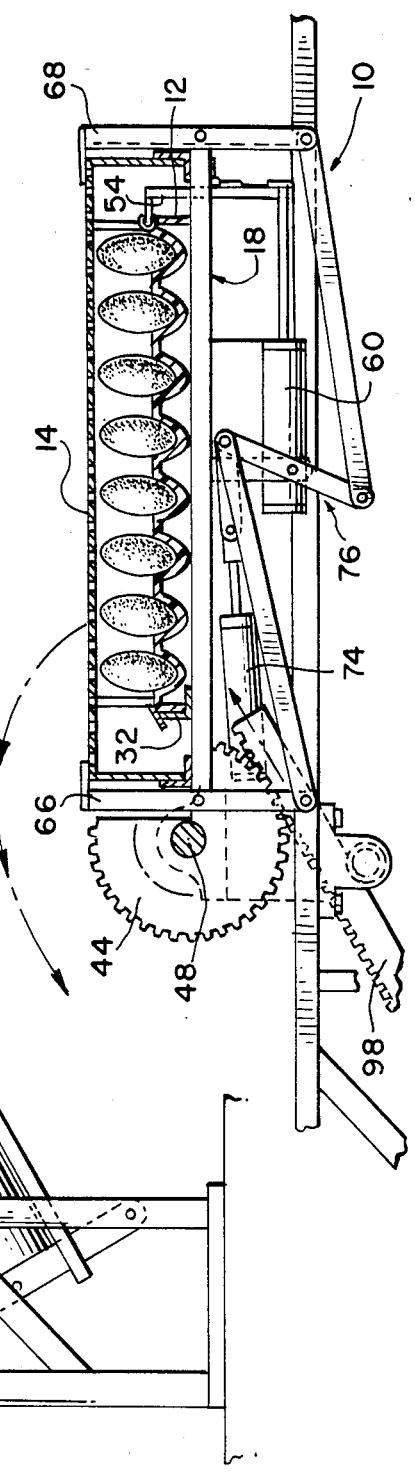

METHOD AND APPARATUS FOR TRANSFERRING EGGS

BACKGROUND OF THE INVENTION

1. Field of the Invention

The present invention relates to a method and apparatus for transferring eggs, and more particularly, to those adapted to transfer eggs from incubator flats to hatching trays.

In order to efficiently utilize space and heat within incubators of modern chick hatcheries, eggs are closely arranged by rows and columns on flats before being placed in the incubator. Each flat usually comprises a thin, somewhat flexible sheet of plastic material having a closely arrayed pattern of surface undulations which hold the eggs in place. When the chicks are about to hatch, the eggs need to be removed from the incubator and transferred from the flats onto hatching trays. These trays are larger than the flats to accommodate the chicks after they hatch.

2. Related Art

In the past, the step of transferring eggs from the incubator flats to the hatching trays was done manually, at great costs in time and labor and with a substantial risk of accidents that would result in eggs being broken.

It is known to transfer the eggs with two workers operating at opposite ends of a manually operated device comprising a clamp pivotally mounted along one of its longitudinal edges to a table. In operation, the clamp is opened so that flats laden with incubated eggs can be placed on top of one of the opened leaves of the clamp. An empty hatching tray is then inverted and placed over the flats. The operator then closes the other leaf of the clamp over the tray and in opposing relation with the other leaf. When closed, portions of the two leaves define a handle which one of the operators grabs for maintaining the leaves in closed relation while the clamp is pivoted to a second, inverted position over the table. During the inversion of the clamp, the operators also grip the tray and flats from opposite ends of the clamp. The inversion causes the eggs to be transferred to the hatching tray. The leaves of the clamp are then spread open, and the flats and tray are separated and removed. The process is repeated for the next set of flats.

The above manner of operation has the disadvantage that it requires two workers, and if any of them release their grip during the inversion of the clamp, some or all of the eggs might be released and allowed to fall and break. The arrangement of the clamp handle also puts one of the operators in an awkward position, because he must press together one of the free ends of a clamped tray and flat while maintaining his grip on the handle of the clamp. Moreover, the arrangement relies upon the skill and memory of the operators to ease the tray down upon the opposite side of the tabe at the end of the pivoting of the clamp. If their attention lapses or if they are hurried, they might bring the tray and flat down too hard against the table and cause eggs to break.

In requiring two workers, the above manner of pperation is labor-intensive and therefore costly. It also requires that the two become familiar with the steps involved and how to cooperate with each other. During their learning phase, there is increased chance of mistakes, resulting in broken eggs and the need for clean-up.

OBJECTS AND SUMMARY OF THE INVENTION

Accordingly, it is an object of the present invention to provide an arrangement for automatically transferring eggs from incubator flats to a hatching tray both rapidly and with a minimum risk of breakage of eggs.

It is another object to effect the transfer of eggs more rapidly and with less labor than with previous operations.

Yet another object is to automatically transfer eggs from a flat to a hatching tray with provision for preventing the tray from landing too harshly at the end of its travel.

It is a further object to effect automatic transfer of eggs while positively and securely clamping the egg flats and hatching tray together, so that eggs are not allowed to escape during their transfer.

Still another object is to provide an egg transfer device which is simple and efficient to operate with only one worker.

Yet another object is to provide the automatic transfer of eggs by inverting an egg flat and hatching tray, with provision for easing the tray and flat to a final resting position at the end of the inversion so as to minimize breakage of eggs.

Still yet another object is to provide an egg transfer device which is cost-effective and reduces egg breakage, so as to make hatchery operations more economical.

These and other objects are achieved by the present invention which provides an egg transfer device for automatically transferring eggs from a first holder such as an egg flat to a second holder such as a hatching tray. The egg transfer device comprises a support such as a frame which is provided with first and second arrangements for releasably securing the first and second holders to the support, respectively, with the second holder being inverted and superposed over the first holder, and a drive arrangement for inverting the support so that the first holder becomes inverted and superposed over the second holder. The device also includes an arrangement for controllably actuating the first and second releasable securing arrangements and an arrangement for controllably actuating the inverting arrangement.

Preferably, the device further comprises a table, with the drive arrangement for inverting the frame including a pivotal connection between the support and the table, an arrangement for pivoting the frame from a first position to an inverted position and an arrangement for automatically braking the motion of the frame as the frame moves adjacent its inverted position.

The present invention also provides a method for transferring eggs from a flat to a tray, which method includes the steps of placing a first holder laden with eggs upon a frame, inverting a second holder and superposing it over the first holder, releasably securing the first and second holders to the frame, inverting the frame with a controllable drive arrangement and automatically braking the motion of the frame as the frame moves adjacent to the inverted position.

Preferably, the method further comprises the steps of automatically securing and releasing the second holder upon actuating the drive arrangement so that the second holder is automatically secured to the frame before the frame is moved to its inverted position and is automatically released before the frame is returned to its first, uninverted position.

BRIEF DESCRITIPTON OF THE DRAWINGS

The above and other objects of the invention will be better appreciated from the following detailed description and with reference to the accompanying drawings, wherein:

FIG. 1 is a perspective view of a preferred embodiment of the present invention;

FIG. 2 is a sectional view along lines II—II in FIG. 1, prior to closing of the tray locks;

FIG. 3 is a detail taken from FIG. 2, after closing of the tray locks;

DETAILED DESCRIPTION OF THE PREFERRED EMBODIMENTS

Figure 7:
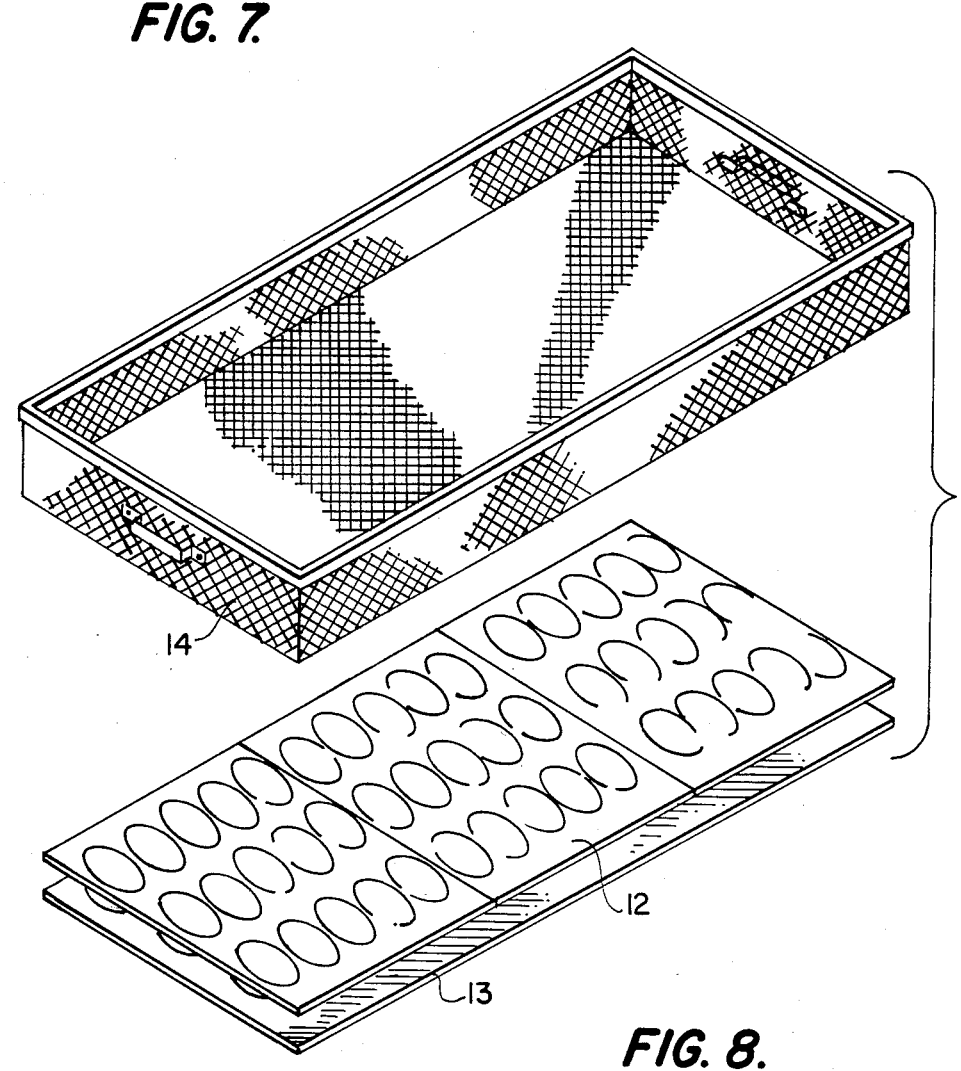
FIG. 7 is a perspective view of three egg flats together with a hatching tray and a pallet.

Referring to FIGS. 1 and 7, an automatic egg transfer device 10 according to a preferred embodiment of the present invention is provided for transferring egg from a plurality of incubator flats 12 to a hatching tray 14 efficiently and with a minimum risk of breakage to eggs.

Each of three flats 12 have a closely arranged pattern of detents for receiving eggs in a space efficient manner. It is a common practice to have flats 12 arranged in stacks of rows of three on a wheeled cart to facilitate movement of a large number of eggs at the hatching facility. A steel pallet 13 is used to support a row of three flats 12 as they are moved from the cart and placed on the egg transfer device 10.

A typical hatching tray 14 includes wire mesh walls and is typically wider than the flats 12.

The automatic egg transfer device 10 preferably includes a table 16, a frame 18 mounted to the table 16 by a pivotal connection 22 arranged adjacent a longitudinal edge of the frame 18. It is preferable to have a steel pallet 13 placed beneath the row of flats 12 during placement of the flats 12 upon the frame 18 so that there is sufficient support for the eggs. However, the egg transfer device 10 could be operated without the steel pallet 13.

Referring to FIGS. 1 and 2, clamping arrangements 24 and 26 are arranged on the frame 18 for releaseably securing the flats 12 and the hatching tray 14 to the frame 18. A main drive arrangement 28 is provided for inverting the frame 18 from a first position over the table 16 to a second, inverted position over the table 16.

The frame 18 includes first, second and third longitudinal frame members 30, 32 and 34, each preferably being L-shaped in form. The first longitudinal member 30 and the third longitudinal member 34 are spaced apart sufficiently to receive opposing longitudinal edges of an inverted hatching tray 14. The vertical portions of the first and third longitudinal frame members 30 and 34 help pssition the tray 14 correctly on the frame 18. The second longitudinal frame member 32 serves as a catch for receiving longitudinal edges of a row of flats 12 and the steel pallet 13.

The second longitudinal frame member 32 includes an upper longitudinal beam portion 36 welded to an upper longitudinal edge of an angled beam portion 38. The upper beam portion 36 is preferably inclined so as to facilitate entry of the longitudinal edges of the egg flats 12 into the catch defined by the second frame member 32. The second frame member 32 is spaced from the first longitudinal frame member 30 so as to provide clearance for the hatching tray 14.

The frame 18 includes several transverse members including central members 40 and 42, which are rigidly secured to a pinion wheel 44 of the pivotal connection 22 so that the frame 18 is supported from and rotates with the pinion wheel.

Preferably, the pivotal connection 22 also includes a plurality of journals 46 arranged across the table 16 which rotatably support an axle member 48. The pinion wheel 44 is securely affixed to the axle member so that the pinion wheel 44 and the frame 18 rotate together with axle member 48. The first frame member 30 is spaced from said axle member 48 so as to provide clearance for elements of the tray clamping arrangement. If necessary, connecting brackets may be added between the frame and the axle member 48 as reinforcements to the connection at the pinion wheel 44.

The pinion wheel 44 includes a notch 50 to provide clearance for the first frame member 30 so that the frame 18 can be located close to the axle member 48. This arrangement minimizes the distance that the frame must travel in pivoting about the axle member 48, reduces the power requirements on the main drive arrangement and minimizes the centripedal forces imposed upon the eggs during the travel of the frame 18.

The flat-clamping arrangement 26 includes a pivotal flat lock 52, which is spaced from and cooperates with the second frame member 32 to releaseably secure a row of flats 12 to the frame 18. The pivotal flat lock 52 preferably includes an upper angled beam 54 having an inverted L-shaped cross section, a lower beam 56 arranged parallel to the upper angled beam 54 and vertical, connecting members 58 which are pivotally mounted to the frame 18. A first air cylinder 60 is provided for driving the flat lock 52. A piston arm of the first air cylinder 60 is pivotally connected to a central portion of the lower beam 56 of the flat lock 52. The other end of the first air cylinder 60 is connected to a mounting bracket 62 fixed to the frame 18. Preferably, only a single first air cylinder is positioned centrally beneath the frame 18 to operate the flat lock 52.

Preferably, a rubber cover 64 is provided along the inward horizontal edge of the upper angled beam 54 to mnnimize the possibility of eggs being broken should the beam 54 come into contact with them.

The tray clamping arrangement 24 preferably includes a first pair of tray locks 66 pivotally mounted along one of the longitudinal edge portions of the frame 18 and a second pair of tray locks 68 pivotally mounted to the other longitudinal edge portion of the frame 18 in an opposing relationship to the members of the first pair 66. Preferably, the first tray locks 66 are pivotally mounted along the outer face of the first longitudinal frame member 30, with space being provided between the first longitudinal frame member 30 and the axle member 48 to accommodate the movement of the first pair of tray locks 66. The second tray locks 68 are pivotally mounted to an outer face of the third longitudinal frame member 34.

Actuators 70 are provided for moving opposing members of the first and second tray locks 66 and 68 simultaneously to and from a retracted position (FIG. 2) and a clamping position (FIG. 3). At the retracted position, the hooked ends 72 of the tray locks 66 and 68 are spaced sufficiently apart to accommodate placement of an inverted hatching tray 14 onto the frame 18. At the clamping position, the hooked ends 72 of the tray locks 66 and 68 engage corner portions of the tray 14 so as to releaseably secure the tray 14 to the frame 18.

Referring particularly to FIG. 2, each of the tray lock actuators 70 includes one of a set of second air cylinders 74 mounted to the frame 18 and linkage 76 connecting the second air cylinder with both of the lower ends 78 and 80 of opposing members of the first and second pairs of tray locks 66 and 68. The linkage includes a first linkage member 82 pivotally connected to a fixed mounting bracket 84 located underneath the frame 88. A second linkage member 86 connects an upper end of the first linkage member 82 to one end of the second air cylinder 74, the other end of the second air cylinder 74 being pivotally connected to the frame 18 by a bracket located under the first longitudinal frame member 30. A third linkage member 88 connects the lower end 78 of the respective first tray lock 66 to the upper end of the first linkage member 82. A fourth linkage member 90 connects a lower end of the first linkage member 82 with the free end 80 of the opposing member of the second tray locks 68.

The first and second drive cylinders 60 and 74 are conventional two-inch stroke air cylinders which include conventional arrangements therein for adjusting the pressure at which the cylinders undergo their forward and return power strokes.

In the preferred embodiment, two second air cylinders 74 are provided for operating the two opposing pairs of first and second tray locks 66 and 68. Of course, the arrangement could be modified to operate all tray locks 66 and 68 with a single air cylinder 74, as would be made apparent to one of ordinary skill in the pertinent art upon becoming familiar with this disclosure.

The frame 18 is also provided with a pair of stops 92 in the form of rods extending upwardly from the outer face of the third longitudinal frame member 34. Preferably, the stops 92 are provided with rubber tips and extend sufficiently above the third longitudinal frame member 34 so as to contact the table 16 as the frame 18 arrives at its inverted position of FIG. 4.

A second set of stops 94 similar to the first are provided on the table 16. The second set of stops 94 are provided with sufficient length and are located so as to contact the frame 18 as it arrives at the return position of FIGS. 1 and 2. In the preferred embodiment, the second set of stops 94 contact an underside of the third longitudinal frame member 34.

It is to be understood that the table 16 could be an open framework or other suitable arrangement.

Figure 4:
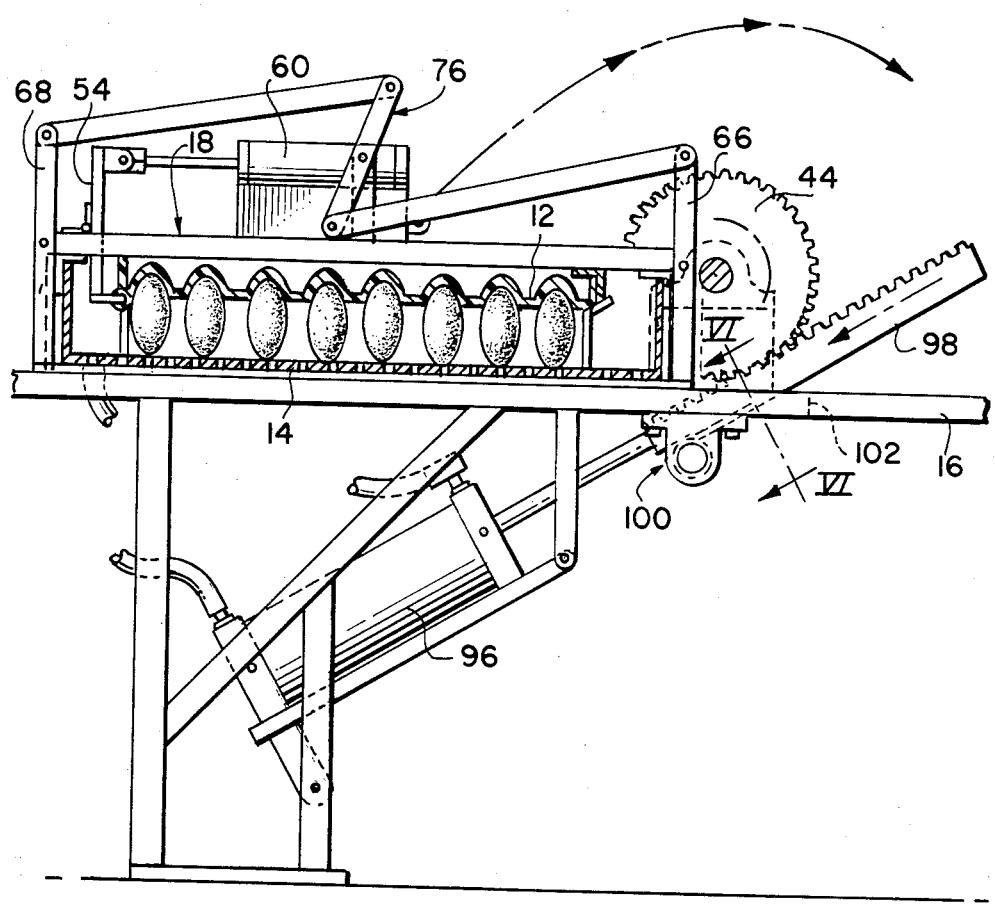
FIG. 4 is a partial, side sectional view of the arrangemeht of FIG. 1 showing the frame in an inverted position.

Referring to FIGS. 2 and 4, the main drive arrangement 28 for inverting the frame 18 includes a main air cylinder 96 operatively connected to a gear rack 98 so as to move the gear rack 98 along its longitudinal axis at an angle relative to the table 16. The gear rack 98 is meshed with the pinion wheel 44 so as to cause the pinion wheel 44 to rotate upon actuation of the main air cylinder 96. A bearing arrangement 100 is provided beneath the table 16 which receives an underside of the gear rack to further support and guide the gear rack. An opening 102 is provided in the table 16 to accommodate the movement of the gear rack 98.

During the forward stroke of the main air cylinder 96, the gear rack 98 travels through the opening 102 in the table 16 to cause the pinion wheel 44 to rotate in a counter-clockwise direction. This action in turn causes the frmme 18 to pivot about the axle member 48 toward its inverted position (FIG. 4). The diameter of the pinion wheel 44 is selected so that when the main air cylinder 96 has undergone its full forward stroke, the frame 18 arrives at its inverted position. At the end of the return stroke of the main cylinder 96, the frame 18 is returned to its original, uninverted position.

The main air cylinder 96 in the preferred embodiment is a conventional twelve-inch stroke air cylinder having a one-inch air cushion feature operative at the end of its forward stroke. Such an air cylinder is presently available as a Wabco Model No. P86-183-3120. The one-inch cushion effect at the end of the forward stroke is used to brake the motion of the gear rack 98 and frame 18. As a result, the frame 18 is not allowed to bang harshly against the table 16 as it approaches its inverted position. This feature is an automatic safeguard against eggs being broken during the travel of the frame 18.

Figure 8:
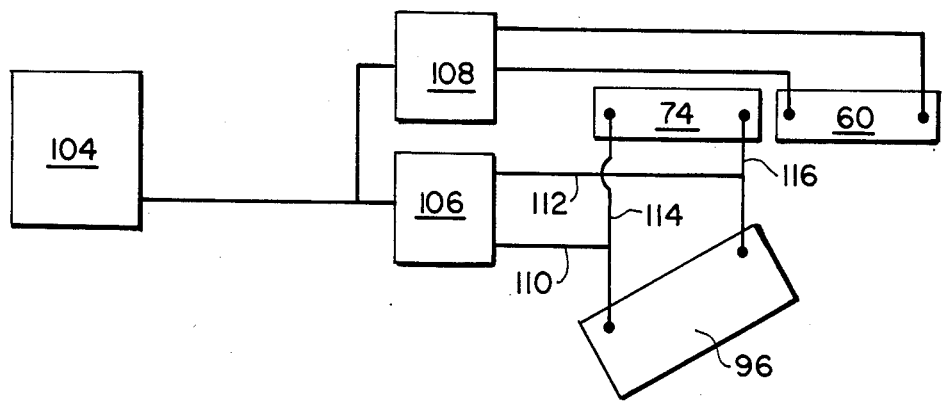
FIG. 8 is circuit diagram of the air cylinder drive system of the arrangement of FIG. 1.

Referring to FIGS. 1 and 8, the automatic egg transfer device 10 includes arrangements for controllably actuating the main cylinder 96 and the first and second cylinders 60 and 74. Referring particularly to FIG. 8, the arrangements include a source of pressurized air 104 which is communicated with first and second control switches 106 and 108. The first switch has a first outlet communicated by a first pressure line 110 to a first inlet of the main drive cylinder 96 for causing the main drive cylinder 96 to undergo its forward stroke when the first switch 106 opens the first line 110. A seoond line 112 connects a second outlet of the first switch 106 with the other inlet of the main drive cylinder 96 for causing the main drive cylinder to undergo its return stroke when the second line 112 is opened by the first switch 106. The first switch 106 is arranged to open the first air line 110 while closing the second air line 112, and vice versa. A third air line 114 is branched off the first air line 110 an communicates with the forward stroke inlet of the second air cylinders 74 operating the tray locks 66 and 68. A fourth air line 116 is branched from the second air line 112 and communicates with the return stroke inlet of the second air cylinders 74.

The second air cylinders 74 are adjusted to operate from the third air line 114 at a lower pressure than the main drive cylinder 96 so that they complete their forward strokes prior to the forward stroke of the main drive cylinder 96. As a result, the second air cylinders 74 automatically close the tray locks 66 and 68 before the main air cylinder causes 96 the frame 18 to pivot.

The second air cylinders 74 are also adjusted to operate from the fourth air line 116 at a lower pressure than the main air cylinder 96 so that they initiate their return stroke at the beginning of the return stroke of the main air cylinder 96. As a result, the second air cylinders 74 automatically release the hatching tray before the main air cylinder 96 returns the frame 18 to its original, uninverted position. These adjustments could be effected by other suitable arrangements such as with regulating elements located in the third and fourth air lines 114 and 116, as would be apparent to one of ordinary skill in the pertinent art upon becoming familiar with this disclosure.

The outlets of the second switch 108 are communicated with the forward and return inlets of the first air cylinder 60, respectively. The second switch 108 is provided for operating the first air cylinder 60 separately from the other air cylinders.

Referring particularly to FIG. 1, the first and second switches 106 and 108 preferably include toggle boxes which are located on the table 16 spaced sufficiently far from the pivotal connection 22 so that clearance is provided for the frame 18 when it arrives at its inverted position.

Figure 6:
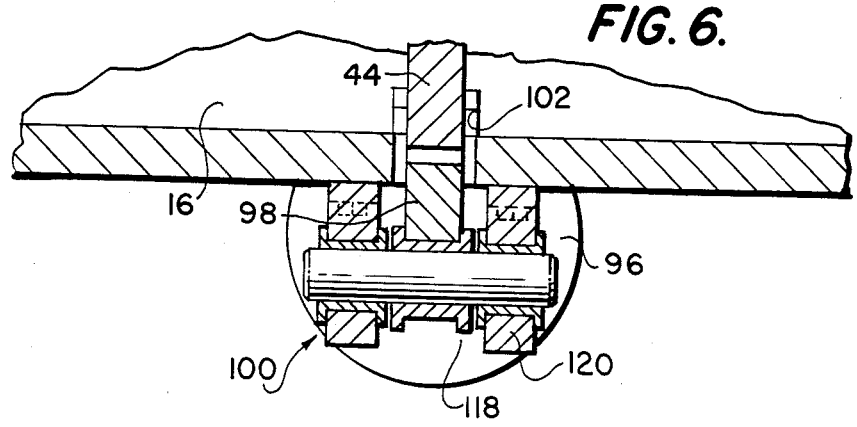
FIG. 6 is a sectional view taken along line VI—VI in FIG. 4.
Figure 5:
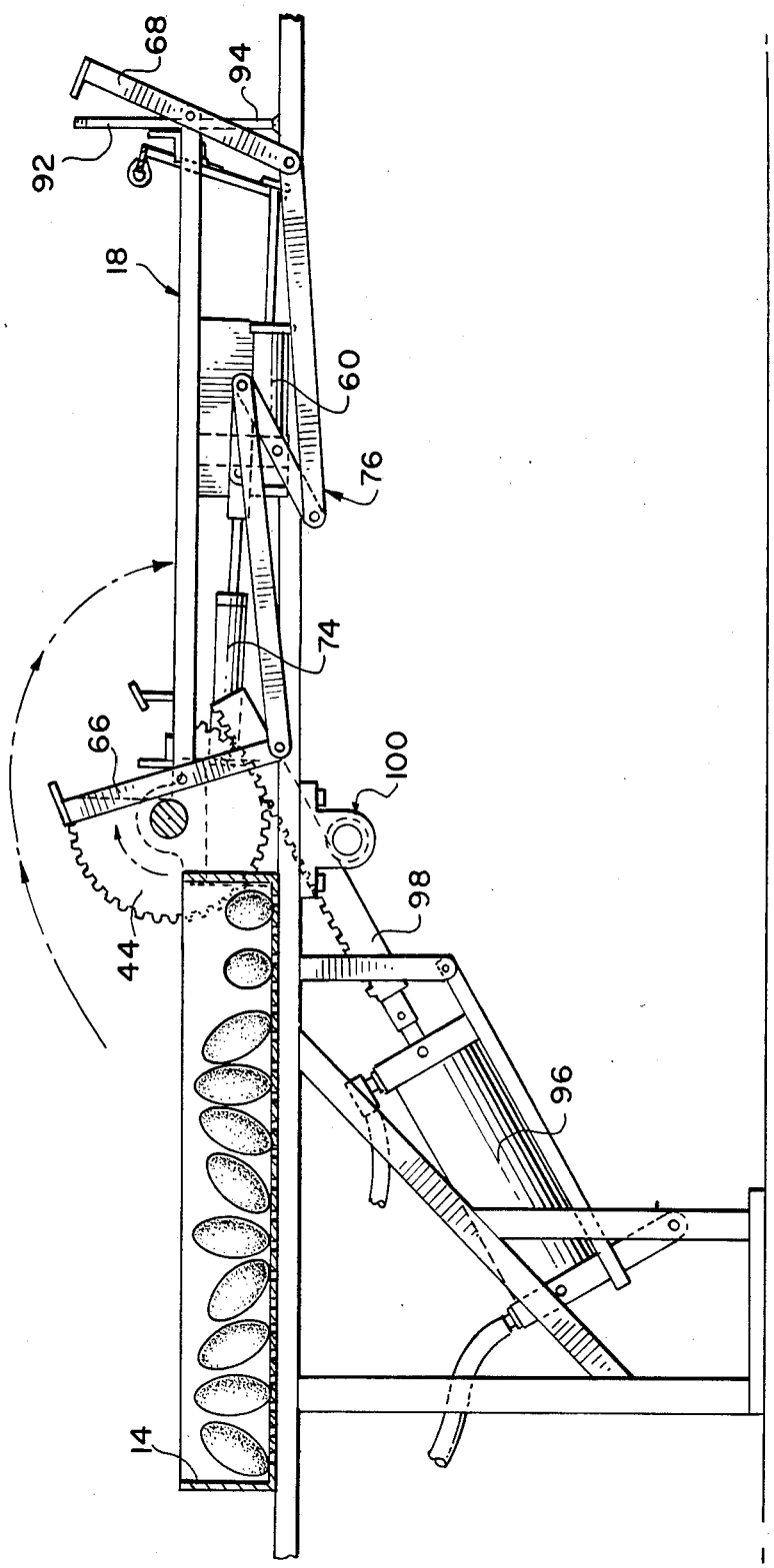
FIG. 5 is a side sectional view showing the frame in its uninverted position with the tray locks and flat locks opened.

Referring to FIG. 6, the bearing arrangement includes a roller 118 which receives a lower edge portion of the gear rack 98 and a journal 120 rotatably supporting the roller 118 beneath the table 16.

Referring particularly to FIG. 2, operation of the egg transfer device 10 and a method for transferring eggs from an incubator flat 12 to a hatching tray 14 includes having the frame 18 returned to its first, uninverted position with the first and second air cylinders 60 and 74 at their returned operating positions so that the tray locks 66 and 68 the flat lock 52 are fully opened. A steel pallet 13 is inserted beneath a row of three flats 12 loaded with eggs and the flats 12 and the pallet 13 are transferred onto the frame 18. The operator temporarily secures the flats 12 to the frame 18 by inserting a longitudinal edge of the flats 12 in the catch defined by the second longitudinal frame member 32. The operator then actuates the second air cylinder control switch 108 to cause the flat lock 52 to clamp the opposite longitudinal edge of the flats 12.

An empty hatching tray 14 is then inverted and placed over the flats 12, with longitudinal edges of the tray 14 being placed adjacent the first and third longitudinal frame members 30 and 34. Thereupon the operator operates the first air cylinder control switch 106 to close the first and second tray locks 66 and 68 against the tray 14. Referring to FIG. 3, as the tray locks close, the main air cylinder 96 is also actuated to cause the gear rack 98 to move forwardly and rotate the frame 18 together with the hatching tray 14 and flats 12.

Referring to FIG. 4, just prior to the arrival of the frame 18 to its inverted position, the air cushion feature of the main air cylinder brakes the motion of the frame 18 so that the tray 14 together with the flats 12 are gently placed adjacent the table 16. The stops 92 also come into contact with the table 16. After the arrival of the frame to its inverted position, the eggs are lying in the hatching tray 14, and the operator then again actuates the first control switch 106 to release the hatching tray 14 together with the eggs and to have the frame 18 returned to its original, uninverted position. The frame 18 carries away the empty flats 12 to the first, uninverted position of the frame 1B. The operator then actuates the second control switch 108 to open the flat lock 52. The operator then removes the hatching tray 14 and the flats 12 from the table 16, and the above process is then be repeated for the next set of incubator flats 12 and holding tray 14.

It is to be appreciated that the above device 10 and method provides for rapid transfer of eggs from the flats 12 to the hatching tray 14 with a minimum of labor and work steps by the operator. The application of the air cushion to brake the motion of the frame at the end of the travel toward the inverted position is very effective in avoiding the breakage of eggs. Additionally, the respective pressure settings of the second air cylinders 74 relative to the main air cylinder 96 and operating them off a common switch reduces the number of switching operations that the operator must perform during a work cycle of the device 10. The device 10 automatically clamps and releases a hatching tray 14 without requiring further steps from the operator. Additionally, the arrangement is easy to clean and maintain.

It is to be understood that the present invention may be embodied in other specific forms without departing from the spirit or essential characteristics of the present invention. The preferred embodiments are therefore to be considered to be illustrative and not restrictive. The scope of the invention is indicated by the appended claims rather than by the foregoing description and all changes or variations which fall within the meaning and range of the claims are therefore intended to be embraced therein.

What is claimed is:

1. An egg transfer device for transferring eggs from a first holder to a second holder, comprising:
   a table means;
   support means for supporting a first holder and a second holder with said second holder inverted and superposed over the first holder, said support means provided with first means for releasably securing the first holder to said support means and second means for releasably securing said second holder to said support means;
   drive means for moving said support means from a first position to a second, inverted position, and back to said first position whereby the frst holder is inverted and superposed over the second holder in said second position;
   first means for controllably actuating said first releasable securing means;
   second means for controllably actuating said second releasable securing means for releasing said second holder in said second position;
   means for controllably actuating said drive means; and
   said drive menas includes a main piston cylinder arrangement fixed relative to said table and a drive connection between said main piston-cylinder and said support means so that upon a forward stroke of the main piston-cylinder the support is moved from the first position to the second position and upon a return stroke of the main piston-cylinder the support means is moved from said second position to said first position, said position actuating means including means for actuating said first piston-cylinder arrangement automatically at a beginning of each forward and return stroke.

2. The egg transfer device as claimed in claim 1, wherein said first releasable securing means includes pivotal means for releasably clamping a first portion of the first holder to said support means, said first controllable actuating means including a first piston-cylinder arrangement attached to said support means.

3. The egg transfer device as claimed in claim 2, wherein said first releasable securing means includes fixed means for engaging a second portion of the first holder.

4. The egg transfer device as claimed in claim 1, wherein said second releasable securing means includes pivotal means for releasably clamping the second holder to said support means and a first piston-cylinder arrangement for operating said pivotal clamping means.

5. An apparatus for transferring eggs from a flat to a tray, comprising:
table means;
a frame;
means for pivoting said frame relative to said table means to and from a first position and a second, inverted position, said pivoting means including a pivotal connection between said frame and said table means, a main piston-cylinder driver affixed to said table means and means for operatively connecting said main piston-cylinder driver and said frame, means for controlling said main piston-cylinder driver and means for automatically braking motion of said frame as said frame moves adjacent said second position;
first means for temporarily securing a flat to said frame including a first pivotal clamping member pivotally connected with said frame and a first piston-cylinder driver operatively connected with said first clamping member, said first piston-cylinder driver provided on said frame;
second means for temporarily securing a tray to said frame with the tray in superposed and inverted relation to the flat, said second securing means including a second clamping member pivotally connected with said frame and a second piston-cylinder driver operatively connected with said second clamping member, said second piston-cylinder driver provided on said second frame; and
means for controlling said first and second piston-cylinder drivers.

6. The apparatus as claimed in claim 5, wherein said main piston-cylinder driver is air operated.

7. The apparatus as claimed in claim 5, wherein said main piston-cylinder driver drives a gear rack of a rack and pinion arrangement supported by said table means, said frame secured to said pinion.

* * * * *